US009791559B2

(12) United States Patent
Eisele et al.

(10) Patent No.: US 9,791,559 B2
(45) Date of Patent: Oct. 17, 2017

(54) OPTICAL DISTANCE MEASUREMENT DEVICE WITH CALIBRATION DEVICE TO TAKE CROSS-TALK INTO ACCOUNT

(71) Applicant: Robert Bosch GmbH, Stuttgart (DE)

(72) Inventors: Andreas Eisele, Leinfelden-Echterdingen (DE); Bernd Schmidtke, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 335 days.

(21) Appl. No.: 14/401,281

(22) PCT Filed: Mar. 19, 2013

(86) PCT No.: PCT/EP2013/055621
§ 371 (c)(1),
(2) Date: Nov. 14, 2014

(87) PCT Pub. No.: WO2013/170982
PCT Pub. Date: Nov. 21, 2013

(65) Prior Publication Data
US 2015/0124241 A1    May 7, 2015

(30) Foreign Application Priority Data
May 18, 2012   (DE) .................. 10 2012 208 308

(51) Int. Cl.
*G01C 3/08* (2006.01)
*G01S 7/497* (2006.01)
(Continued)

(52) U.S. Cl.
CPC ............. *G01S 7/497* (2013.01); *G01C 3/08* (2013.01); *G01C 25/00* (2013.01); *G01S 7/4911* (2013.01);
(Continued)

(58) Field of Classification Search
CPC ........ G01S 7/497; G01S 7/4911; G01S 17/08; G01S 17/36; G01S 7/4913; G01S 7/4918; G01C 3/08; G01C 25/00
See application file for complete search history.

(56) References Cited

U.S. PATENT DOCUMENTS 3,740,533 A * 6/1973 van Zeggelaar .......... E02F 7/04
700/71
5,559,496 A * 9/1996 Dubats ................... G08B 25/10
250/338.1
2011/0121182 A1   5/2011 Wong et al.

FOREIGN PATENT DOCUMENTS

DE   101 30 763 A1   1/2003
DE   101 59 932 A1   6/2003
(Continued)

OTHER PUBLICATIONS

International Search Report corresponding to PCT Application No. PCT/EP2013/055621, mailed Jun. 24, 2013 (German and English language document) (5 pages).

Primary Examiner — Samantha K Abraham
(74) Attorney, Agent, or Firm — Maginot, Moore & Beck LLP

(57) ABSTRACT

A measurement device for measuring an optical distance of an object includes an emission device configured to emit a first signal towards the object. The measurement device further includes a modulator device configured to modulate the first signal and a reception device configured to detect a second signal. The measurement device also includes an analysis device configured to receive and analyze the second signal. The measurement device further includes a calibration device configured to calibrate the measurement device with the modulator device turned on and with the emission device operated below a pre-definable power threshold value.

7 Claims, 4 Drawing Sheets

(51) Int. Cl.
*G01C 25/00* (2006.01)
*G01S 17/36* (2006.01)
*G01S 17/08* (2006.01)
G01S 7/491 (2006.01)

(52) U.S. Cl.
CPC .............. *G01S 17/08* (2013.01); *G01S 17/36* (2013.01); *G01S 7/4913* (2013.01); *G01S 7/4918* (2013.01)

(56) References Cited

FOREIGN PATENT DOCUMENTS

| DE | 10 2009 045 323 A1 | 4/2011 |
|---|---|---|
| EP | 2 450 722 A1 | 5/2012 |
| WO | 2008/089480 A2 | 10/2008 |

\* cited by examiner

OPTICAL DISTANCE MEASUREMENT DEVICE WITH CALIBRATION DEVICE TO TAKE CROSS-TALK INTO ACCOUNT

This application is a 35 U.S.C. §371 National Stage Application of PCT/EP2013/055621, filed on Mar. 19, 2013, which claims the benefit of priority to Serial No. DE 10 2012 208 308.1, filed on May 18, 2012 in Germany, the disclosures of which are incorporated herein by reference in their entirety.

BACKGROUND

Optical distance measurement devices are known, which can ascertain a distance between the distance measurement device and a target object. For this purpose, the distance measurement devices emit a light beam in the direction of the target object and detect light which is reflected from the object and returns in the direction of the distance measurement device.

The ascertainment of the distance can be performed by means of a runtime method, also referred to as a time-of-flight method. The measurement can occur in the time range or in the frequency range in this case. In the case of a chronological measurement, for example, a short laser pulse can be emitted at a point in time $t_{start}$ toward the target object and scattered or reflected thereon. A part of this measurement radiation arrives at the optical receiver, for example, via a receiving optical system and reaches the receiver at a point in time $t_{stop}$. The distance d of the target object is calculated from the measured runtime ($t_{stop}-t_{start}$) and the speed of light $c_0$.

In the case of a measurement in the frequency range or according to the phase runtime method, the optical radiation of a light source can be modulated in a sinusoidal manner in its intensity, for example. This modulated radiation is emitted toward the target object and scattered or reflected thereon. A part of the reflected radiation arrives at an optical receiver, for example, via a receiving optical system. As a function of a distance to the target object, the received sinusoidal intensity-modulated radiation has a phase offset to the emitted sinusoidal intensity-modulated signal. The distance to the target object can be calculated from the phase difference between received and emitted signal, the known modulation frequency, and the speed of light. Alternatively to the sinusoidal intensity modulation mentioned as an example, square-wave pulses and other modulation forms can be selected. Ambiguities in the assignment of a distance to a phase can be resolved by measurements at multiple closely adjacent frequencies. The measurement precision of the above-described distance measurement devices is not always satisfactory, however.

SUMMARY

Therefore, a demand can exist for a measurement device and a method, which enable the measurement precision and reliability of a distance measurement to be improved.

This demand can be covered by the object of the present disclosure according to the independent claims. Advantageous embodiments of the present disclosure are described in the dependent claims.

Features, details, and possible advantages of a device according to embodiments of the disclosure are discussed in detail hereafter.

According to a first aspect of the disclosure, a measurement device for optical distance measurement is provided. The measurement device has an emission device, a modulator device, a reception device, an analysis device, and a calibration device. The emission device is embodied to emit a first signal toward an object. The modulator device is embodied to modulate the first signal, for example, periodically in intensity, amplitude, and/or in the frequency. The reception device is embodied in this case to detect a second signal and relay it to the analysis device, for example. The analysis device is configured to receive and analyze the second signal. For example, the analysis device can be configured to ascertain the distance of the measurement device from the object from the phase difference between the first and the second signal, the known modulation frequency, and the speed of light. The calibration device is embodied to calibrate the measurement device, while the modulator device is turned on and while the emission device is operated below a pre-definable power threshold value. I.e., the calibration occurs while the modulator device is operated at full power, for example, and the emission device is operated at very low power or is turned off, for example. In this case, the power threshold value relates to the optical output power, in particular to the mean optical output power which is emitted from the emission device.

The second signal is in this case the signal received by the reception device. In the case of a calibration measurement, the second signal can only have optical background radiation. In contrast, in the case of a distance measurement, the second signal can have both background radiation and also measurement radiation returning from the object.

In other words, the idea of the present disclosure is based on the finding that crosstalk occurs between the modulator device and the reception device or between an emission path and a reception path, and this can result in a systematic distance measurement error. On the one hand, the crosstalk can cause the supply voltage and the sensitivity of the reception device to change. On the other hand, a width of sampling windows for the detection of the second signal by the reception device can change due to the crosstalk, since the electrical signals of the opening and closing of sampling windows are influenced.

In particular in the embodiment of the reception device using SPADs (single photon avalanche diodes), in the case of which the modulator device, the reception device, and the analysis device can be integrated in one chip, on the one hand, a crosstalk can result between modulator device and reception device, which influences the supply voltage of the SPADs, for example. On the other hand, a crosstalk can result between modulator device and analysis device, which has an effect on the width of sampling windows or bins.

During the calibration of the measurement device according to the disclosure by the calibration device, this crosstalk is taken into account. The calibration takes place for this purpose with the modulator device turned on. Simultaneously, the emission device is operated during the calibration below a predefined power threshold value. For example, the emission device can be embodied as a laser or laser diode and can be operated during the calibration below the laser threshold, so that no measurement radiation or negligibly little measurement radiation is emitted toward the target object or the laser operates at extremely low efficiency. In this manner, for example, a mechanical shutter in the beam path can be omitted, which would unnecessarily enlarge the dimensions of the measurement device. In particular in the case of handheld distance devices, it can be advantageous to reduce the weight by omitting a mechanical closing device.

In this manner, by operating the modulator device, the electrical crosstalk between emission path and reception path is already present to its full extent during the calibration, without the radiation reflected from the target object being detected. In this manner, a systematic measurement error can be ascertained simply and efficiently and taken into account during the following distance measurement.

The measurement device can be a handheld or stationary installed distance measurement device. The emission device can be a source for optical radiation, for example, a laser diode, in particular a red laser diode. The emission device can also be referred to as an emitter. The emission device is embodied to emit a first signal oriented toward an object. The object can also be referred to as a target object. The first signal can also be referred to as measurement radiation or signal light. For example, the first signal can have a wavelength of 635 or 650 nm. In this case, the emission device can be powered during a distance measurement using a direct current of approximately 30 mA, for example. During a calibration measurement, this current can be less than a predefined limiting value of, for example, 20 mA, preferably 10 mA, and in particular 5 mA.

The modulator device can also be referred to as an on-chip laser modulator and can have an oscillator, for example. The modulator device is embodied in this case to vary the first signal in intensity, amplitude, and/or frequency. For example, the modulator device can modulate the first signal periodically, for example, in a sinusoidal manner. This can be performed, for example, using a modulation of the laser diode current at an AC amplitude of 5 mA with a DC laser diode current of 30 mA, for example.

The reception device can be a detector, which has, for example, at least one avalanche photodiode (APD), or at least one single photon avalanche diode (SPAD). The reception device is embodied to detect a second signal. The second signal can have in this case, for example, during a distance measurement, both measurement radiation which is reflected or returned by the target object and also background radiation. During a calibration measurement, the second signal can only comprise background radiation. The second signal is transmitted to the analysis device, in which the distance from the measurement device to the target object can be ascertained, for example, by means of an algorithm.

The analysis device can be, for example, a control device. In particular, the analysis device can be embodied as an application-specific integrated circuit, also referred to as an ASIC. In this case, the analysis device can control, for example, the time measurement and/or the modulation of the first signal and/or the modulation of the reception device. In particular, the analysis device, in the case of the embodiment of the reception device as a SPAD, can assign digital signals received by the reception device to various counters. The counters or counts represent different detection periods in this case. These detection periods can be referred to as bin widths or sampling windows. In the case of a distance measurement, the sum of the detection periods should correspond to the period of the modulated first signal. In other words, during one detection period, a periodically repeating phase range of the periodically modulated detection signal is registered and the corresponding digital detection signals are accumulated in counters. A phase difference between the emitted first signal and the received second signal can be concluded from the counter results of the digital counters accumulated over many detection periods, and the distance to the target object can be ascertained therefrom.

The calibration device can be embodied as a separate unit or, for example, as part of the analysis device. The calibration device is embodied to calibrate the measurement device. For this purpose, the calibration device can, for example, activate the modulator device, initiate a modulation of the emission device, and simultaneously keep the DC supply below a predefined threshold. In other words, the calibration device can activate the emission device in such a manner that it emits no or only very little measurement radiation while the modulator device is active. The second signal received during a calibration measurement, which only contains background radiation, can be used for the purpose of calculating out a systematic measurement error during the distance measurement.

According to one exemplary embodiment of the disclosure, the calibration device is embodied, during the calibration of the measurement device, to take into account a crosstalk between the reception device and the modulator device. Crosstalk can be in this case an undesired mutual influence of actually independent signal channels. The crosstalk can be inductive or capacitive, for example.

According to one exemplary embodiment of the disclosure, the second signal only has optical background radiation in the case of a calibration measurement. In the case of a distance measurement, in contrast, the second signal has both background radiation and also measurement radiation returning from the object. The background radiation can be uniformly distributed optical radiation in this case, for example. In contrast to measurement radiation background radiation is not modulated. Alternatively, the background radiation can be understood as radiation which is not necessarily not modulated, but is not radiation which is correlated with the first signal.

According to a further exemplary embodiment of the disclosure, the reception device can be embodied integrally with the analysis device. Integral can mean in this case that the reception device is embodied in one piece, i.e., in one component with the analysis device. For example, both the reception device and also the analysis device can be implemented in one chip. In such an embodiment of the measurement device, the described calibration is particularly advantageous, since the effect of crosstalk can be particularly pronounced in the event of integration of the reception device in the analysis device.

Furthermore, all devices can be combined with one another as desired. For example, the reception device can be embodied in one piece or integrally with the analysis device. Furthermore, the reception device, the analysis device, and the calibration device can be combined to form one device. All mentioned devices, and also the emission device, can be integrated on one chip.

According to a further exemplary embodiment of the disclosure, the reception device has at least one avalanche photodiode (APD) or at least one single photon avalanche diode (SPAD). In particular in the case of an SPAD-based distance measurement, the analysis device and the reception device can be integrated side-by-side in the same chip.

According to a further exemplary embodiment of the disclosure, the emission device is embodied as a laser, in particular as a laser diode. For example, a red laser diode having a wavelength of 635 or 650 nm can be used. In this case, the calibration device can be embodied to operate the laser below a laser threshold during a calibration operation. I.e., no measurement radiation is emitted.

According to a second aspect of the disclosure, a method for calibrating an above-described measurement device is described. The method has the following steps: operating an emission device to emit a first signal at a power which lies below a pre-definable power threshold; operating a modulator device, in particular using full power supply for modulating the first signal of the emission device; detecting a second signal by means of a reception device, and calibrating the measurement device by means of a calibration device, based on the second signal.

BRIEF DESCRIPTION OF THE DRAWINGS

Further features and advantages of the present disclosure will become apparent to a person skilled in the art from the following description of exemplary embodiments, which are not to be interpreted as restricting the disclosure, however, with reference to the appended drawings.

FIG. 3 shows a graphic representation of theoretical and measured sampling values of the second signal in the case of exposure using unmodulated background light and with emission and modulator devices turned on.

FIG. 5 shows a graphic representation of measured sampling values in the case of exposure using unmodulated background light and with emission device turned off and modulator device turned on.

DETAILED DESCRIPTION

All figures are only schematic illustrations of devices according to the disclosure or the components thereof according to exemplary embodiments of the disclosure. In particular distances and size relationships are not shown to scale in the figures. Corresponding elements are provided with the same reference numbers in the various figures.

Figure 1:
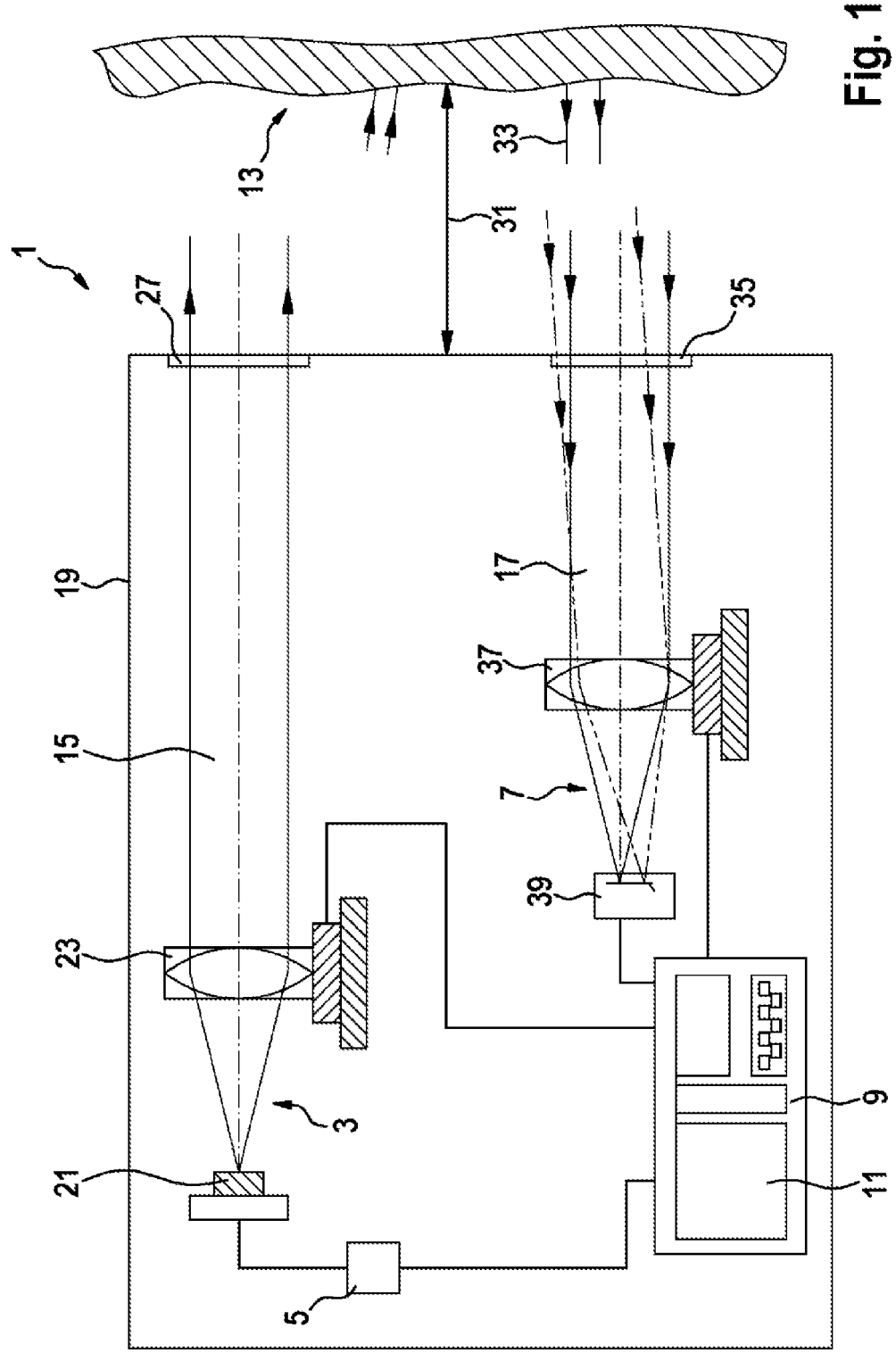
FIG. 1 shows a block diagram of a measurement device according to one exemplary embodiment of the disclosure.
Figure 7:
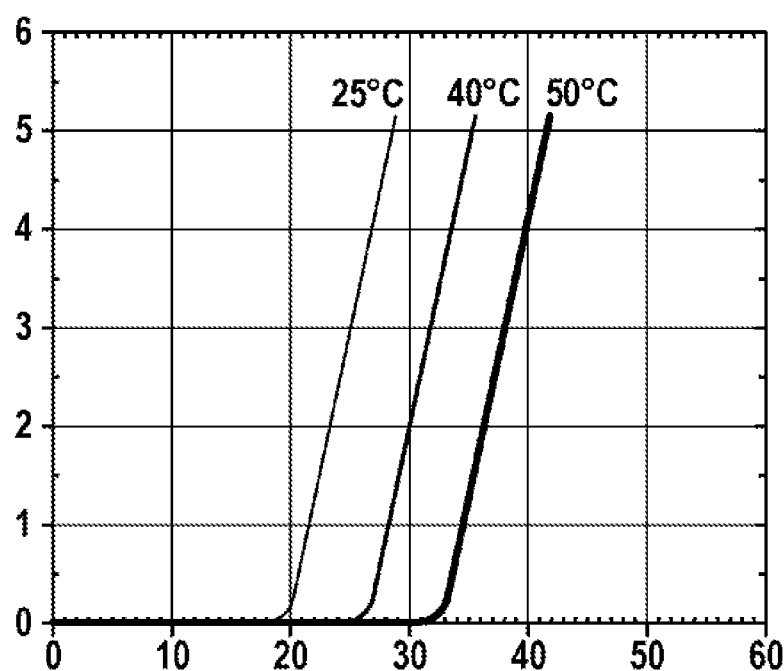
FIG. 7 shows characteristic curves of a laser diode at different temperatures.

FIG. 1 shows a cross section through a measurement device 1. The measurement device 1 can be a handheld distance measurement device in this case. The measurement device 1 can have a housing 19, in which an emission device 3, a modulator device 5, a reception device 7, an analysis device 9, and a calibration device 11 are provided. The emission device 3 is embodied for emitting a first signal 15 toward a target object 13. For this purpose, the emission device 3 can have a light source 21, for example, a semiconductor laser diode, and an objective lens 23. The laser diode can have in this case a temperature-dependent characteristic curve as shown in FIG. 7, for example. In FIG. 7, a current is plotted in milliamps on the X axis and a power is plotted in milliwatts on the Y axis in this case. The right curve corresponds to a characteristic curve at 50° C., the middle curve to 40° C., and the left curve to 25° C.

The laser or the laser diode is turned on or regulated in the power via a variable direct current. The threshold from which the laser emits light is at 25 mA, for example. The laser is operated during a distance measurement using a direct current of 30 mA, for example. The laser power is restricted in this case, for example, at a laser class II, to 1 mW mean power. The modulation current with modulator device 5 turned on is, for example, 10 mA or 5 mA.

The first signal 15, also referred to as measurement radiation, can be chronologically modulated in its amplitude or frequency and in particular in its intensity by a modulator device 5. During a distance measurement, the first signal 15 can leave the measurement device 1 through an optical window 27. After leaving the measurement device 1, the first signal 15 is scattered or reflected on the target object 13, which is located at a distance 31 from the measurement device 1. The reflected radiation 33 passes through a further optical window 35 into the measurement device 1 and is detected there together with unmodulated background radiation as the second signal 17 by a reception device 7. The reception device 7 can have in this case a reception optical system 37 and a reception detector 39. The second signal 17 is transmitted to the analysis device 9 from the reception device 7. In the analysis device 9, the distance 31 of the target object 13 from the measurement device 1 is ascertained with the aid of the phase runtime method.

Particularly in the case of long distances or strong background light, the measurement results of the distance measurement can be corrupted as a result of an unfavorable signal-to-noise ratio. Therefore, the measurement device 1 according to the disclosure can carry out a calibration measurement to improve the reliability of the measurement result. During the calibration measurement, for example, a calibration device provided in the analysis device 9 can activate the emission device 3 in such a manner that it is operated below a power threshold value. I.e., practically no detectable first signal 15 is emitted during the calibration measurement. For example, for this purpose the laser diode runs below a laser threshold. In this case, the calibration device 11 is embodied to turn on the modulator device 5 during the calibration input. In this manner, only unmodulated background radiation reaches the reception device 7, the detection of which is already influenced by the crosstalk, which is caused by the operation of the modulator device 5. The crosstalk can take place in this case between the modulator device 5 and the reception device 7 and/or between the modulator device 5 and the analysis device 9. On the basis of the second signal detected under these conditions, a systematic error caused by crosstalk can be ascertained and taken into account during a subsequent distance measurement. This can substantially increase the measurement precision of the distance 31.

Figure 2:
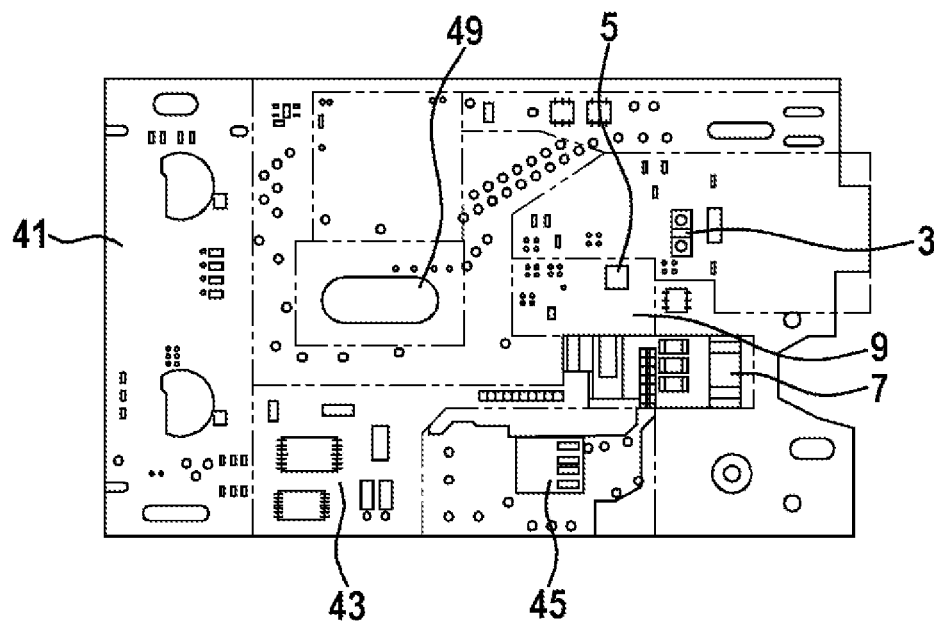
FIG. 2 shows a part of a measurement device according to a further exemplary embodiment of the disclosure.

FIG. 2 shows a further exemplary embodiment of a measurement device 1. In this case, FIG. 2 shows a circuit board, on which an emission device 3 in the form of a laser diode having a driver and a corresponding network is arranged. Furthermore, an 8 MHz oscillator, a p-controller, a power source 41, a high-voltage generator 43, and an analog low-frequency path 45 are arranged on the circuit board. In addition, the circuit board has a reception device 7, which is embodied as an APD or SPAD having a corresponding network. Furthermore, an analysis device 9 is provided on the circuit board, which is embodied as an ASIC, which is embodied for time measurement and/or modulation of the emission device 3 and/or the receiver device 7. A modulator device 5 is provided in the analysis device 9.

The effect of the crosstalk due to the operation of the modulator device 5 will be discussed in greater detail on the basis of FIGS. 3 to 6. In this case, eight sampling windows, also referred to as bins, are shown in each case on the X axis in FIGS. 3 to 6. The eight sampling windows correspond to a sampling period, and a sampling value, a so-called sample value, is obtained from each sampling window. The scaled intensity of the detected second signal in percent, in relation to its mean value over the modulation period, is shown on the Y axis. To ascertain the values in FIGS. 3 and 4, in this case conventional devices are used, in which radiation 33 reflected from the target object 13 can be mechanically blocked to clarify the effect of the crosstalk. In the measurement device 1 according to the disclosure, however, a mechanical element is not required for the calibration.

Figure 3:
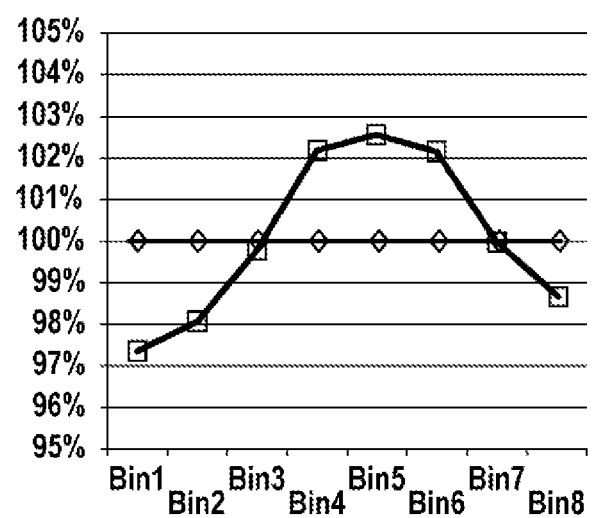

FIG. 3 shows the problem of crosstalk between an emission path and a reception path. In the illustrated example, the measured values are ascertained with modulator device 5 turned on in the emission path and with operation of the laser diode above the laser threshold. In this case, the radiation 33 reflected from the target object 13 is blocked on the reception side, so that the reception device 7 is only illuminated with constant, unmodulated background light. The second signal 17 received by the reception device 7 is periodically sampled synchronously with the modulation frequency. Under these conditions, the essentially sinusoidal curve illustrated with rectangular measurement points results. The sine shape over a detection period is caused by crosstalk between emission and reception paths. In this case, the crosstalk influences the sensitivity of the reception device and/or the width of the sampling window, for example.

The curve parallel to the X axis, which is shown with diamonds, corresponds to theoretical sampling values of an ideal system without crosstalk. In the ideal system, equal sampling values are detected during all sampling windows.

To be able to correct the errors due to crosstalk, a crosstalk vector which corresponds to the measured values in FIG. 3 must be known. For example, in a handheld laser distance measurement device, an ascertainment of the crosstalk vector is not readily possible. A one-time calibration in the manufacturing would be possible. However, the crosstalk can change in amplitude and phase via temperature, process, and voltage variations, and also due to aging. It could therefore be necessary to carry out a calibration measurement before each distance measurement. To prevent signal light from reaching the detector, for example, a mechanical shutter must interrupt the beam path. Such an element would enlarge the dimensions of the device and cause additional costs, however. A calibration measurement with laser turned off or operation of the laser below the laser threshold is therefore advantageous.

Figure 4:
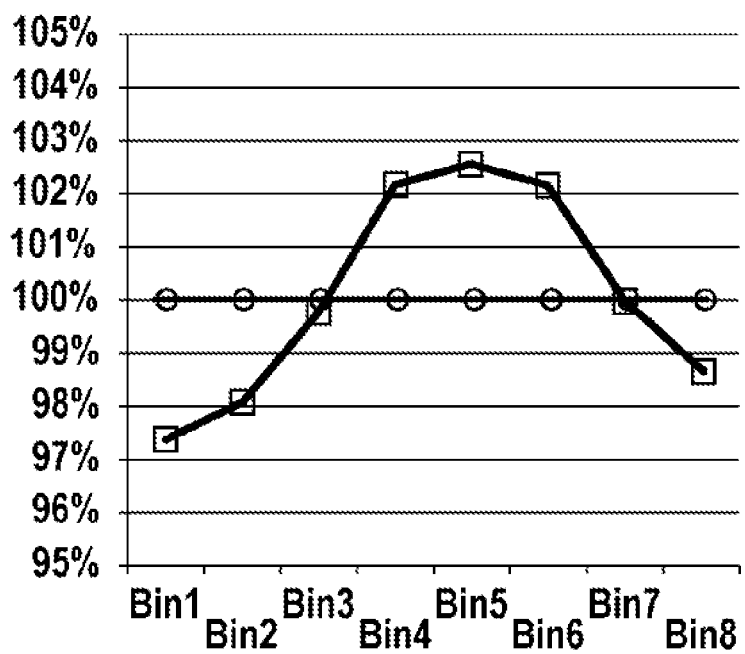
FIG. 4 shows a graphic representation of measured sampling values in the case of exposure using unmodulated background light and with emission device turned on and modulator device turned off.

FIG. 4 shows measured sampling values of the second signal upon exposure with unmodulated background light with modulator device 5 turned off and with operation of the emission device 3 below the laser threshold, i.e., laser DC off. The corresponding values are shown in the curve parallel to the X axis having measured values shown as circles. For comparison, the sinusoidal measurement curve with modulator device 5 turned on in the emission path and with operation of the emission device 3 above the laser threshold, as already known from FIG. 3, is shown.

It is apparent from FIG. 4 that with modulator device 5 turned off, the measured values almost correspond to the ideal theoretical values without crosstalk. It can be concluded therefrom that the crosstalk is primarily caused by the modulator device 5. Therefore, the modulator device 5 must be turned on for the determination of the crosstalk vector.

Figure 5:
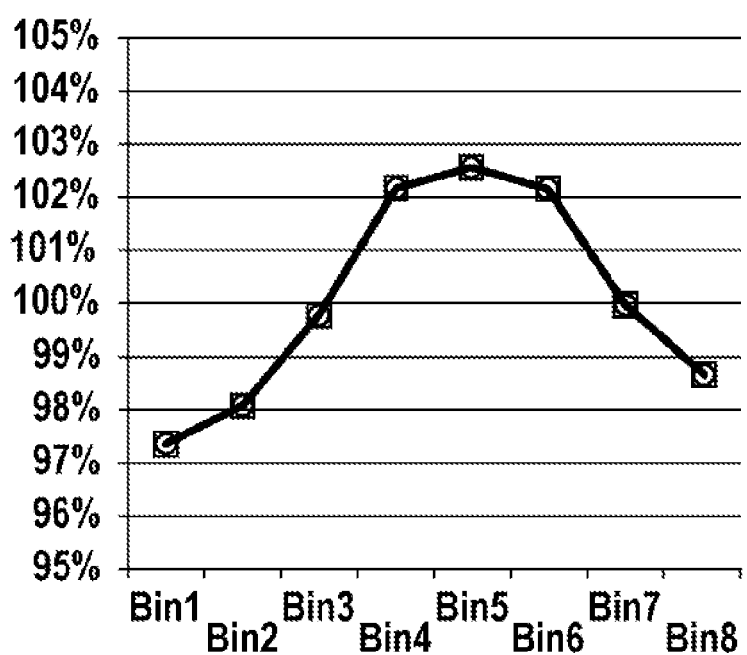

FIG. 5 shows the sampling values of the reception signal in the case of unmodulated background light with modulator device 5 turned on and with operation of the emission device 3 below a predefined power threshold value. Furthermore, the curve, which is already known from FIG. 3 and FIG. 4, of sampling values with modulator device 5 turned on and with operation of the emission device 3 above the laser threshold is shown in FIG. 5. Both curves lie one over another. It can be concluded therefrom that the crosstalk vector is nearly independent of the DC operating point of the laser diode.

Figure 6:
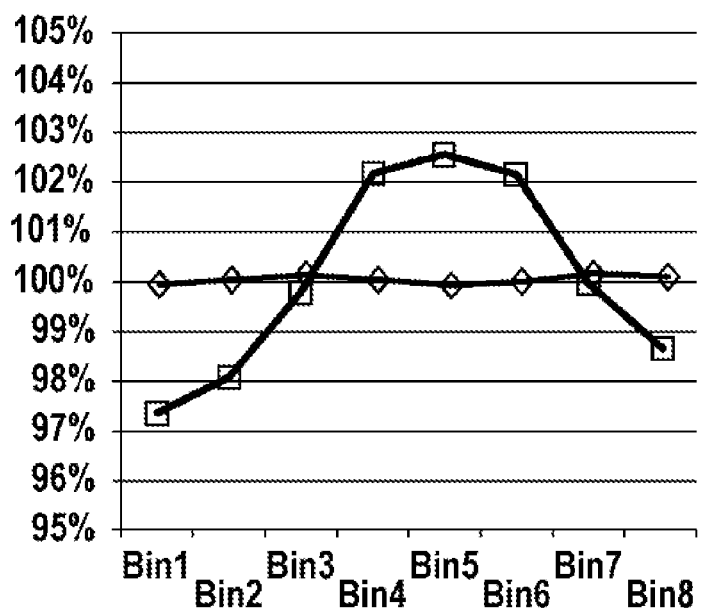
FIG. 6 shows a graphic representation of measured sampling values after a calibration by means of the calibration device.

FIG. 6 again shows the measurement curve known from FIGS. 3, 4, and 5, which is sinusoidal and which was recorded with modulator device 5 turned on and emission device turned on. Furthermore, an already calibrated measurement curve is shown in FIG. 6, which extends nearly parallel to the X axis and almost corresponds to the theoretical curve from FIG. 3. In this case, the measured sampling values of a distance measurement of each bin (laser DC on, modulator device on) are divided by the sampling value of the calibration measurement of each bin (laser DC off, modulator device on). The value of bin 1 recorded during a distance measurement is divided in this case by the value of bin 1 recorded during a calibration measurement. This applies similarly to the values of the further bins.

Finally, it is to be noted that expressions such as "having" or the like are not to exclude that further elements or steps can be provided. Furthermore, it is to be noted that "a" or "one" does not exclude a plurality. In addition, features described in conjunction with the various embodiments can be combined with one another as desired. Furthermore, it is to be noted that the reference signs in the claims are not to be interpreted as restrictive of the scope of the claims.

The invention claimed is:

1. A measurement device for measuring an optical distance of an object, the measurement device comprising:
    an emission device configured to emit a first optical signal towards the object, the emission device being configured to operate with a first power level during a calibration process, the first power level being lower than a second power level used during optical distance measurement;
    a modulator device configured to modulate the first optical signal during the calibration process and during optical distance measurement;
    a reception device configured to detect a second optical signal, the second optical signal including an optical background radiation component and a measurement radiation component, the measurement radiation component resulting from the first optical signal being reflected from the object, the measurement radiation component receiving substantially no detectable signal when the emission device is operated at the first power level that is below a power threshold value during the calibration process;
    an analysis device configured to, at least during optical distance measurement, receive and analyze the second optical signal to determine an optical distance of the object; and
    a calibration device configured to calibrate the measurement device by determining a systematic error with reference to the second optical signal received during the calibration process.

2. The measurement device as claimed in claim 1, wherein the calibration device is configured to calibrate the measurement device determine the systematic error with reference to a crosstalk between at least one of (i) the reception device and the modulator device and (ii) the analysis device and the modulator device.

3. The measurement device as claimed in claim 1, wherein the reception device and the analysis device are integrally embodied.

4. The measurement device as claimed in claim 1, wherein the reception device has at least one of (i) an avalanche photodiode and (ii) a single photon avalanche diode.

5. The measurement device as claimed in claim 1, wherein the emission device includes a laser and the laser is operated below a laser threshold of the laser during the calibration process.

6. The measurement device as claimed in claim 1, wherein the calibration device is configured to calibrate the measurement device such that the measurement radiation component of the second optical signal detected by the reception device during optical distance measurement is divided by the optical background radiation component of the second optical signal detected during the calibration process.

7. A method for calibrating a measurement device, the method comprising:

- emitting, during a calibration process, a first optical signal using an emission device towards an object using a first power level, the first power level being lower than a second power level used during optical distance measurement;
- modulating the first optical signal of the emission device using a modulator device during the calibration process;
- detecting a second optical signal using a reception device, the second optical signal including an optical background radiation component and a measurement radiation component, the measurement radiation component resulting from the first optical signal being reflected from the object, the measurement radiation component receiving substantially no detectable signal when the emission device is operated at the first power level that is below a power threshold value during the calibration process;
- receiving and analyzing the second signal using an analysis device; and
- calibrating the measurement device using a calibration device by determining a systematic error with reference to the second optical signal received during the calibration process, wherein the measurement device includes the emission device, the modulator device, the reception device, the analysis device, and the calibration device.

* * * * *